(12) United States Patent
Kim et al.

(10) Patent No.: US 11,749,841 B2
(45) Date of Patent: Sep. 5, 2023

(54) METHOD FOR MANUFACTURING ELECTRODE ASSEMBLY AND METHOD FOR MANUFACTURING SECONDARY BATTERY

(71) Applicant: LG Chem, Ltd., Seoul (KR)

(72) Inventors: Hyun Tae Kim, Daejeon (KR); Shin Hwa Lee, Daejeon (KR); Woo Yong Lee, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 16/964,455

(22) PCT Filed: Jan. 14, 2019

(86) PCT No.: PCT/KR2019/000555
§ 371 (c)(1),
(2) Date: Jul. 23, 2020

(87) PCT Pub. No.: WO2019/146947
PCT Pub. Date: Aug. 1, 2019

(65) Prior Publication Data
US 2021/0050626 A1    Feb. 18, 2021

(30) Foreign Application Priority Data
Jan. 29, 2018  (KR) .................. 10-2018-0010691

(51) Int. Cl.
*H01M 10/0583* (2010.01)
*G01B 11/02* (2006.01)
*H01M 10/04* (2006.01)

(52) U.S. Cl.
CPC ......... *H01M 10/0583* (2013.01); *G01B 11/02* (2013.01); *H01M 10/0404* (2013.01); *H01M 10/049* (2013.01)

(58) Field of Classification Search
CPC .......... H01M 10/0404; H01M 10/0409; G01B 11/02; G01B 11/005; G01B 11/002;
(Continued)

(56) References Cited

U.S. PATENT DOCUMENTS

2010/0281685 A1   11/2010  Hori et al.
2013/0240323 A1*   9/2013  Min .................. H01M 10/0404
                                                              198/340
(Continued)

FOREIGN PATENT DOCUMENTS

CN    101911365 A    12/2010
CN    103222097 A     7/2013
(Continued)

OTHER PUBLICATIONS

Vikram Mutneja, Methods of Image Edge Detection, Jan. 2015, Journal of Electrical and Electronic Systems (Year: 2015).*
(Continued)

*Primary Examiner* — Matthew T Martin
*Assistant Examiner* — Bartholomew A Hornsby
(74) *Attorney, Agent, or Firm* — Lerner David LLP

(57) ABSTRACT

A method for manufacturing an electrode assembly includes a unit cell grasping step of moving a movable gripper to grasp a unit cell having an electrode and a separator, a vision measurement step of vision-measuring a full width value of the unit cell, and an input step of determining a width difference between the full width value of the unit cell and a set width value stored in a memory, and moving the unit cell by the movable gripper while taking into account the width difference to seat the unit cell on the separation film. A method for manufacturing a secondary battery includes a manufacturing step of manufacturing an electrode assembly
(Continued)

according to the above, and an accommodation step of accommodating the folded electrode assembly in a battery case.

21 Claims, 10 Drawing Sheets

(58) Field of Classification Search
CPC ..... G01B 11/022; G01B 11/04; G01B 11/043; G01B 11/046
See application file for complete search history.

(56) References Cited

U.S. PATENT DOCUMENTS

| 2013/0260211 | A1* | 10/2013 | Min ............... B32B 37/0046 429/163 |
| 2014/0026398 | A1 | 1/2014 | Watanabe et al. |
| 2014/0050958 | A1 | 2/2014 | Kwon et al. |
| 2014/0342215 | A1 | 11/2014 | Kwon et al. |
| 2019/0148777 | A1 | 5/2019 | Kwon et al. |

FOREIGN PATENT DOCUMENTS

| CN | 104106169 | A | | 10/2014 | | |
| EP | 2648262 | A2 | | 10/2013 | | |
| JP | 2000182658 | A | | 6/2000 | | |
| JP | 2011039014 | A | | 2/2011 | | |
| JP | 2011129398 | A | | 6/2011 | | |
| JP | 2012227130 | A | | 11/2012 | | |
| JP | 2017212081 | A | | 11/2017 | | |
| KR | 20060059700 | A | | 6/2006 | | |
| KR | 20100121366 | A | * | 11/2010 | ........ | H01M 10/0459 |
| KR | 20120060705 | A | | 6/2012 | | |
| KR | 20130000617 | A | * | 1/2013 | ............ | B25J 18/00 |
| KR | 20130000617 | A | * | 1/2013 | | |
| KR | 20130000617 | A | | 1/2013 | | |
| KR | 20130101178 | A | | 9/2013 | | |
| KR | 20130132230 | A | | 12/2013 | | |
| KR | 20160051347 | A | | 5/2016 | | |

OTHER PUBLICATIONS

Extended European Search Report including Written Opinion for Application No. 19743569.6 dated Mar. 4, 2021, pp. 1-7.
International Search Report for Application No. PCT/KR2019/000555, dated Apr. 18, 2019, pp. 1-2.
Search Report dated Feb. 21, 2023 from the Office Action for Chinese Application No. 201980007615.8 dated Mar. 1, 2023, pp. 1-3.

* cited by examiner

METHOD FOR MANUFACTURING ELECTRODE ASSEMBLY AND METHOD FOR MANUFACTURING SECONDARY BATTERY

CROSS-REFERENCE TO RELATED APPLICATION

The present application is a national phase entry under 35 U.S.C. § 371 of International Application No. PCT/KR2019/000555, filed Jan. 14, 2019, published in Korean, which claims the benefit of the priority of Korean Patent Application No. 10-2018-0010691, filed on Jan. 29, 2018, the disclosures of which are hereby incorporated by reference in their entirety.

TECHNICAL FIELD

The present invention relates to a method for manufacturing an electrode assembly and a method for manufacturing a secondary battery.

BACKGROUND ART

Secondary batteries are rechargeable unlike primarily batteries, and also, the possibility of compact size and high capacity is high. Thus, recently, many studies on rechargeable batteries are being carried out. As technology development and demands for mobile devices increase, the demands for rechargeable batteries as energy sources are rapidly increasing.

Rechargeable batteries are classified into coin type batteries, cylindrical type batteries, prismatic type batteries, and pouch type batteries according to a shape of a battery case. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive electrodes and a plurality of negative electrodes with a separator therebetween are sequentially stacked, and a stack/folding type electrode assembly in which stacked type unit cells are wound together with a separation film having a long length.

However, in the case of the stack/folding type electrode assembly, if a distance between unit cells disposed on the separation film in an unfolded state is irregular, a position error in which the laminated unit cells vertically disposed when the unit cells are laminated are mutually misaligned may occur to cause a problem in which extraction due to non-charging or overcharging at each misaligned overhang portion occurs.

DISCLOSURE OF THE INVENTION

Technical Problem

One aspect of the present invention is to provide a method for manufacturing an electrode assembly, in which unit cells are capable of being input by reflecting an actual full width value of a unit cell to prevent a folding gap tolerance from occurring between the unit cells, and a method for manufacturing a secondary battery.

Technical Solution

A method for manufacturing an electrode assembly according to the present invention, comprises a unit cell grasping step of moving a movable gripper to grasp a unit cell comprising an electrode and a separator, a vision measurement step of vision-measuring a full width value of the unit cell, and an input step of determining a width difference between the full width value of the unit cell and a set width value stored in a memory, and moving the unit cell by the movable gripper while taking into account the width difference to seat the unit cell on the separation film.

A method for manufacturing a secondary battery according to an embodiment of the present invention, comprises a manufacturing step of manufacturing an electrode assembly according to the foregoing, and an accommodation step of accommodating the folded electrode assembly in a battery case.

Advantageous Effects

According to the present invention, when the plurality of unit cells are folded to manufacture the electrode assembly, the actual input tolerance of the unit cells may be measured and corrected through the vision device. Particularly, the unit cells may be input by reflecting the actual full width of each of the unit cells, which are measured in real time through the vision device instead of the predetermined design value to prevent the gap tolerance from occurring between the unit cells. Thus, when the unit cells are folded to be laminated, the phenomenon in which the overhang occurs due to the existing gap tolerance may be prevented.

MODE FOR CARRYING OUT THE INVENTION

Figure 1:
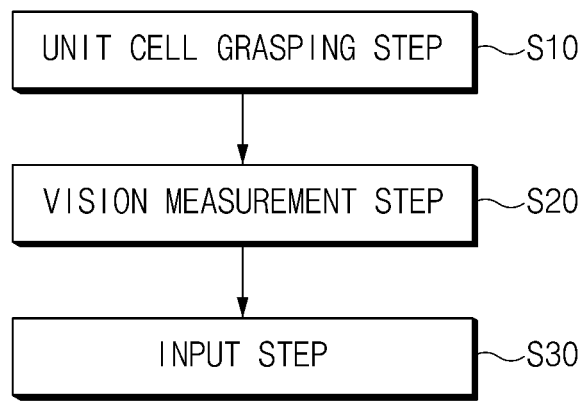
FIG. 1 is a flowchart illustrating a method for manufacturing an electrode assembly according to an embodiment of the present invention.

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Figure 2:
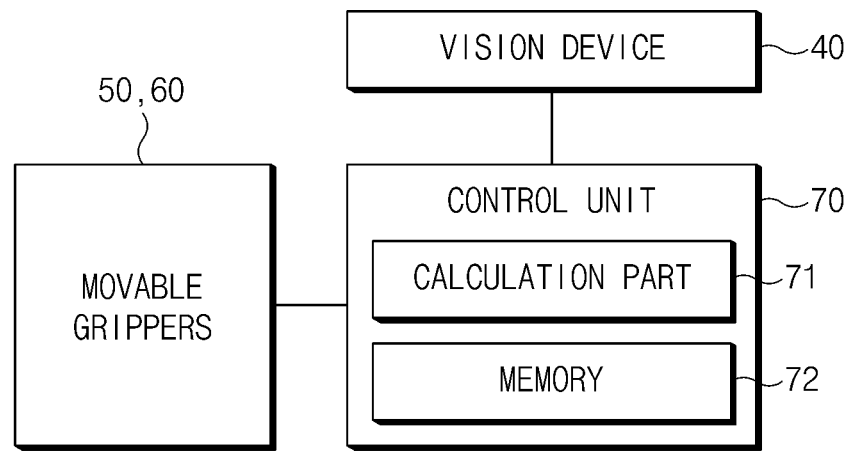
FIG. 2 is a block diagram illustrating the method for manufacturing the electrode assembly according to an embodiment of the present invention.
Figure 3:
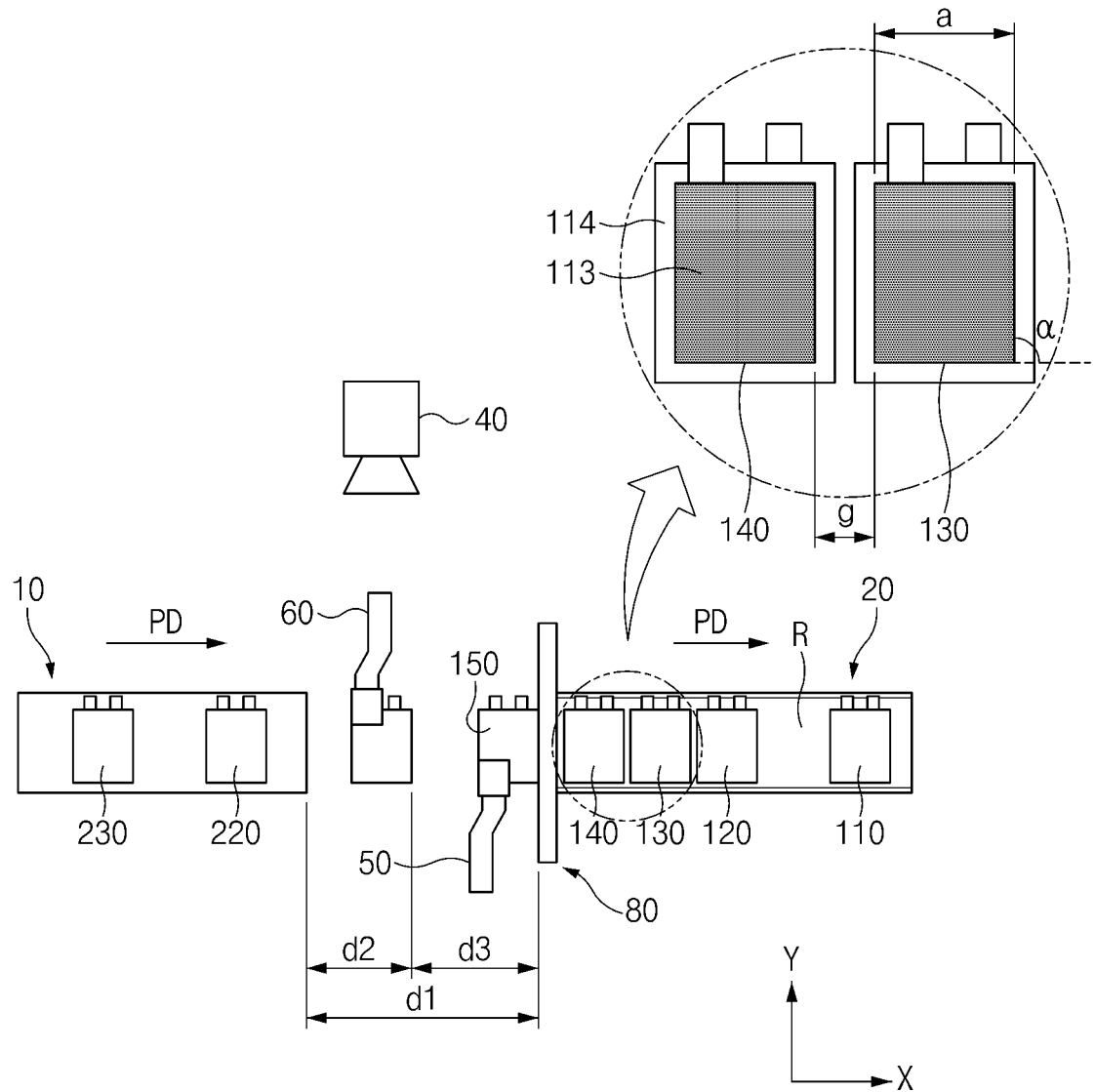
FIG. 3 is a plan view illustrating an example of the method for manufacturing the electrode assembly according to an embodiment of the present invention.

FIG. 1 is a flowchart illustrating a method for manufacturing an electrode assembly according to an embodiment of the present invention, FIG. 2 is a block diagram illustrating the method for manufacturing the electrode assembly according to an embodiment of the present invention, and FIG. 3 is a plan view illustrating an example of the method for manufacturing the electrode assembly according to an embodiment of the present invention.

Referring to FIGS. 1 to 3, a method for manufacturing an electrode assembly according to an embodiment of the present invention is a method for manufacturing an electrode assembly by folding unit cells 110, 120, 130, 140, and 150 after the unit cells 110, 120, 130, 140, and 150, which comprise an electrode 113 and a separator 114, are seated on a separation film R at predetermined intervals and comprises a unit cell grasping step (S10) of grasping the unit cells 110, 120, 130, 140, and 150 by using movable grippers 50 and 60, a vision measurement step (S20) of vision-measuring a full width a of each of the unit cells 110, 120, 130, 140, and 150, and an input step (S30) of moving the unit cells 110, 120, 130, 140, and 150 so as to be seated on the separation film R.

Figure 4:
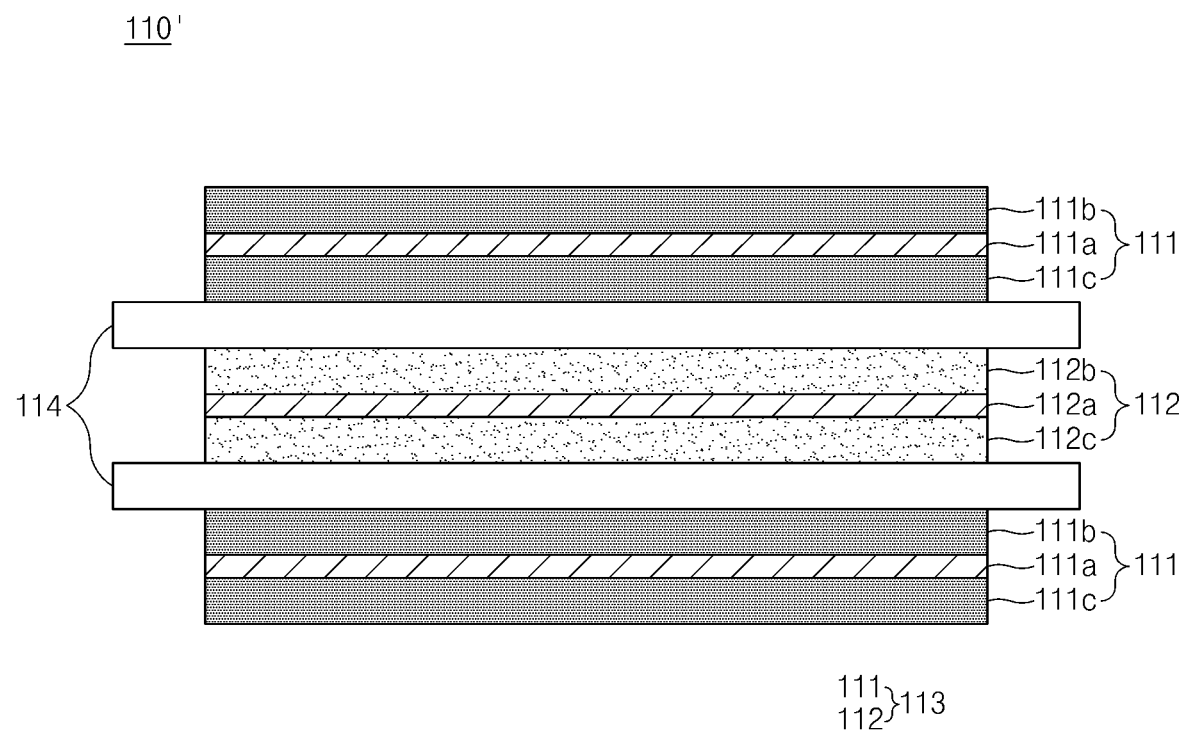
FIG. 4 is a side view illustrating an example of a unit cell in the method for manufacturing the electrode assembly according to an embodiment of the present invention.
Figure 5:
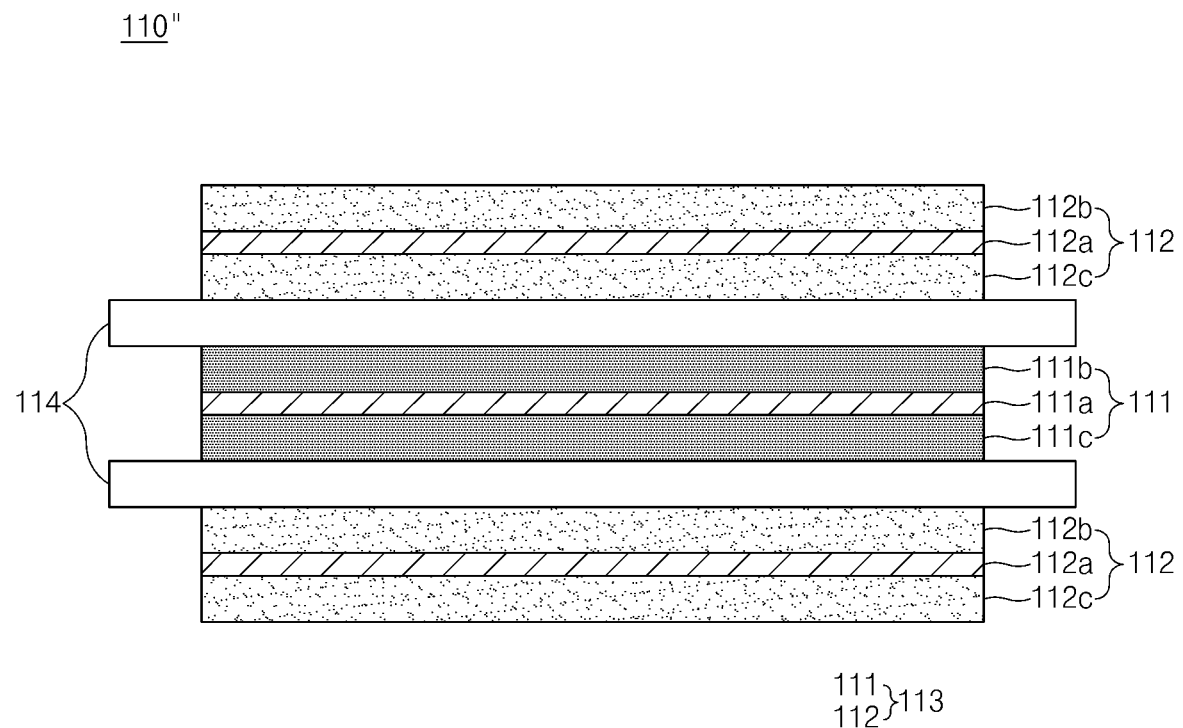
FIG. 5 is a side view illustrating another example of the unit cell in the method for manufacturing the electrode assembly according to an embodiment of the present invention.

FIG. 4 is a side view illustrating an example of the unit cell in the method for manufacturing the electrode assembly according to an embodiment of the present invention, and FIG. 5 is a side view illustrating another example of the unit cell in the method for manufacturing the electrode assembly according to an embodiment of the present invention.

Hereinafter, the method for manufacturing the electrode assembly according to an embodiment of the present invention will be described in more detail with reference to FIGS. 1 to 7.

Referring to FIGS. 1 to 4, in the unit cell grasping step (S10), the movable grippers 50 and 60 may be moved to grasp the unit cells 110, 120, 130, 140, and 150.

Here, when the unit cells 110, 120, 130, 140, and 150 are supplied through a conveyor belt 10, the movable grippers 50 and 60 may grasp the supplied unit cells 110, 120, 130, 140, and 150. Here, the movable grippers 50 and 60 may be, for example, moved to grasp the unit cells 110, 120, 130, 140, and 150 seated on a top surface of an end of the conveyor belt 10 that moves and supplies the unit cells 110, 120, 130, 140, and 150.

Each of the unit cells 110, 120, 130, 140, and 150 may be a chargeable and dischargeable power generation element and have a structure in which the electrode 113 and the separator 114 are alternately laminated.

The electrode 113 may comprise a positive electrode 111 and a negative electrode 112. Also, the separator 114 separates and electrically insulates the positive electrode 111 and the negative electrode 112 from each other.

Thus, one unit cell of the unit cells 110, 120, 130, 140, and 150 may comprise at least one positive electrode 111, at least one negative electrode 112, and at least one separator 114.

The positive electrode may comprise a positive electrode collector 111a and positive electrode active materials 111b and 111c applied to the positive electrode collector 111a. The positive electrode collector 111a may be, for example, foil made of an aluminum material, and the positive electrode active materials 111b and 111c may be made of lithium manganese oxide, lithium cobalt oxide, lithium nickel oxide, lithium iron phosphate, or a compound or mixture thereof containing at least one of these.

The negative electrode 112 may comprise a negative electrode collector 112a and negative electrode active materials 112b and 112c applied to the negative electrode collector 112a. The negative electrode collector 112a may be, for example, foil made of a copper (Cu) or nickel (Ni) material. Each of the negative electrode active materials 112b and 112c may comprise, for example, synthetic graphite, lithium a metal, a lithium alloy, carbon, petroleum coke, activated carbon, graphite, a silicon compound, a tin compound, a titanium compound, or an alloy thereof. Here, each of the negative electrode active materials 112b and 112c may further comprise, for example, silica-based SiO or silica carbide (SiC).

The separator 114 is made of an insulation material, and the positive electrode 111, the separator 114, and the negative electrode 112 are alternately laminated. For example, the separator 114 may be disposed between the positive electrode 111 and the negative electrode 112. Furthermore, for another example, the separator 114 may be disposed between the positive electrode 111 and the negative electrode 112 and be disposed on outer surfaces of the positive electrode 111 and the negative electrode 112. The separator 114 may be, for example, a multi-layer film produced by microporous polyethylene, polypropylene, or a combination thereof or a polymer film for solid polymer electrolytes or gel-type polymer electrolytes such as polyvinylidene fluoride, polyethylene oxide, polyacrylonitrile, or polyvinylidene fluoride hexafluoropropylene copolymers.

The unit cells may be provided as bi-cells in which the same kind of electrodes 113 are disposed on both sides of the cell, or full-cells in which different kinds of electrodes are disposed on both sides of the cell.

More particularly, each of the unit cells 110, 120, 130, 140, and 150 may be provided, for example, as one or more of an A type unit cell 110' (see FIG. 4) in which the positive electrode 111, the separator 114, the negative electrode 112, the separator 114, and the positive electrode 111 are sequentially laminated or a C type unit cell 110" (see FIG. 5) in which the negative electrode 112, the separator 114, the positive electrode 111, the separator 114, and the negative electrode 113 are sequentially laminated.

Here, although the unit cells 110, 120, 130, 140, and 150 are seated on the separation film R in order of, for example, A, C, C, A, A, C, C, A, and A types, the configurations in which the unit cells 110, 120, 130, 140, and 150 are seated on the separation film R in the method for manufacturing the electrode assembly according to an embodiment of the present invention is not limited thereto. For example, the unit cells 110, 120, 130, 140, and 150, which are constituted by various types of bi-cells and full-cells may be seated on the separation film R.

Here, the unit cells 110, 120, 130, 140, and 150 may mutually form a gap g spaced a predetermined distance from each other and may be disposed on the separation film R.

One side portion of an electrode tab is disposed on the electrode 113 and electrically connected to the electrode 113.

In the vision measurement step (S20), a full width a of each of the unit cells 110, 120, 130, 140 and 150 may be vision-measured through a vision device 40. Here, the vision device 40 may be, for example, one of a camera, X-ray or computer tomography (CT). Here, the vision device 40 may be disposed, for example, in one direction of a lateral direction, an upward direction, or a diagonal direction of the unit cells 110, 120, 130, 140, and 150 to vision-measure the full width a of each of the unit cells 110, 120, 130, 140, and 150.

Also, in the vision measurement step (S20), a position of an end of the outermost electrode 113 in a full width direction of the unit cells 110, 120, 130, 140, and 150 may be detected.

Furthermore, in the vision measurement step (S20), the position of the end of the outermost electrode 113 in the full width direction of the unit cells 110, 120, 130, 140, and 150 and an angle of each of the unit cells 110, 120, 130, 140, and 150 may be measured. Here, in the vision measurement step (S20), for example, an angle between a line of the end of the electrode 113 in the full width direction of the unit cells 110, 120, 130, 140, and 150 and an axis perpendicular to a folding progressing direction may be measured. More particularly, in the vision measurement step (S20), for example, when the folding progressing direction is an X axis, an angle of the line of the end in the full width direction of the unit cells 110, 120, 130, 140, and 150 with respect to a Y axis may be measured. Here, in the vision measurement step (S20), in order to detect the angle of the end of the electrode in the full width direction of the unit cells 110, 120, 130, 140, and 150 with respect to the Y axis, for example, an angle α between the X axis and the line of the end of the electrode in the full width direction of the unit cells 110, 120, 130, 140, and 150 may be measured to detect the angle of the end of the electrode in the full width direction.

Also, in the vision measurement step (S20), the unit cells 110, 120, 130, 140, and 150 grasped by the movable grippers 50 and 60 in the unit cell grasping step (S10) may be moved to a place corresponding to a viewing angle of the vision measurement device by the movable grippers 50 and 60 to vision-measure the unit cells 110, 120, 130, 140, and 150.

Figure 6:
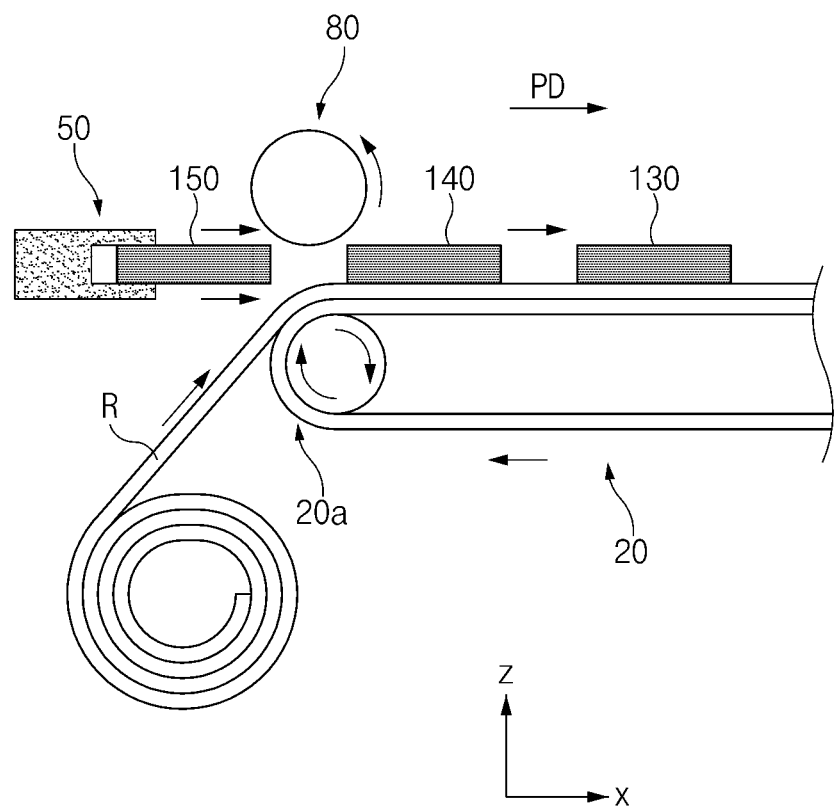
FIG. 6 is a side view illustrating an input step in the method for manufacturing the electrode assembly according to an embodiment of the present invention.

FIG. 6 is a side view illustrating the input step (S30) in the method for manufacturing the electrode assembly according to an embodiment of the present invention.

Referring to FIGS. 1 to 3 and 6, in the input step (S30), the movable grippers 50 and 60 grasp the unit cells 110, 120, 130, 140, and 150 and then move the unit cells 110, 120, 130, 140, and 150 to correspond to a full width value of each of the unit cells 110, 120, 130, 140, and 150, which is measured through the vision measurement step (S20), thereby seating the unit cells 110, 120, 130, 140, and 150 on the separation film R.

Also, in the input step (S30), the movement of the movable grippers 50 and 60 may be controlled by a control unit 70. Here, the control unit 70 may comprise a calculation part 71 and a memory 72.

Furthermore, in the input step (S30), an input moving amount of each of the movable grippers 50 and 60, which are moved to seat the unit cells 110, 120, 130, 140, and 150 on the separation film R, may be calculated in the calculation part 71 through the full width value of each of the unit cells 110, 120, 130, 140, and 150, which is measured in the vision measurement step (S20). Also, the input moving amounts calculated in the control unit 70 may be reflected to move the movable grippers 50 and 60 so that the unit cells 110, 120, 130, 140, and 150 are seated on the separation film R.

Also, in the input step (S30), the control unit 70 may receive an image signal that is vision-measured in the vision measurement step (S20) to extract the full width value of each of the unit cells 110, 120, 130, 140, and 150 and then compare a set value stored in the memory 72 with the extracted full width value to correct the input moving amounts of movable grippers 50 and 60. Also, the control unit 70 may control the movement of the movable grippers 50 and 60 according to the corrected input moving amounts.

Furthermore, in the input step (S30), the control unit 70 may correct each of the input moving amounts of movable grippers 50 and 60 to correspond to the full width value of each of the unit cells 110, 120, 130, 140, and 150 whenever the unit cells 110, 120, 130, 140, and 150 are input. Also, the unit cells 110, 120, 130, 140, and 150 may be input into the input unit so that the gap g corresponding to a gap value between the unit cells 110, 120, 130, 140, and 150 so as to be seated on the separation film R. Here, the input unit may comprise a conveyor belt 20, which moves the separation film R seated thereon, and a lip roller 80 disposed to be spaced a predetermined distance upward from an end of the conveyor belt 20. In the input step (S30), the unit cells 110, 120, 130, 140, and 150 may be input between the conveyor belt 20 and the lip roller 80 so as to be seated on the separation film R.

In the input step (S30), an angle of each of the unit cells 110, 120, 130, 140 and 150 with respect to the Y axis, which is measured through the vision measurement step (S20), may be reflected to correct the movable grippers 50 and 60 so that the unit cells 110, 120, 130, 140 and 150 are parallel to the Y axis.

That is, in the input step (S30), while the control unit 70 adjusts the moving amount of each of the unit cells 110, 120, 130, 140 and 150 in the X-axis direction that is the folding progressing direction and the angle of each of the unit cells 110, 120, 130, 140 and 150 with respect to the Y axis, the unit cells 110, 120, 130, 140 and 150 may be input into the input unit. Here, when the control determines that the angle of each of the unit cells 110, 120, 130, 140 and 150 is misaligned with the Y axis, the angle of each of the unit cells 110, 120, 130, 140 and 150 may be corrected to match the Y axis through the movable grippers 50 and 60.

In the input step (S30), the input moving amount of each of the movable grippers 50 and 60 in the folding progressing direction PD may be, for example, calculated as a total distance d1 of each of the unit cells 110, 120, 130, 140 and 150 moved from a position at which each of the unit cells 110, 120, 130, 140 and 150 is grasped by the movable grippers 50 and 60 to an inlet of the input unit into which the unit cells 110, 120, 130, 140 and 150 are input to be seated on the separation film R.

Also, for another example, in the input step (S30), the input moving amount of each of the movable grippers 50 and 60 in the folding progressing direction PD may be calculated as a distance d3 of each of the unit cells 110, 120, 130, 140 and 150 moved from a position at which the unit cells 110, 120, 130, 140 and 150 are vision-measured through the vision device 40 to the inlet of the input unit. That is, the input moving amount may be calculated as a remaining moving distance d3 of each of the unit cells 110, 120, 130, 140 and 150 except for a distance d2 moved up to the measuring position of the vision device after the unit cells 110, 120, 130, 140 and 150 are grasped by the movable grippers 50 and 60 in the total distance d1 moved up to the input unit after the unit cells 110, 120, 130, 140 and 150 are grasped by the movable grippers 50 and 60.

Thus, when each of the unit cells 110, 120, 130, 140 and 150 is manufactured with a size different from the preset value or supplied at an angle different from the preset value, while the X-axis moving distance and the moving angle of each of the movable grippers 50 and 60 are corrected, the unit cells 110, 120, 130, 140, and 150 may be seated on the separation film R through the input unit to prevent a gap tolerance (error) from occurring between the unit cells 110, 120, 130, 140, and 150 seated on the separation film R according to a deviation in actual full width of each of the unit cells 110, 120, 130, 140, and 150. That is, when a tolerance of the full width occurs while the unit cells 110, 120, 130, 140, and 150 are manufactured, the movement of each of the movable grippers 50 and 60 may be corrected by the tolerance of each of the unit cells 110, 120, 130, 140, and 150 so that the unit cells 110, 120, 130, 140, and 150 are seated on the separation film R with the set gap value between the unit cells 110, 120, 130, 140, and 150, which is stored in the memory 72 to prevent the gap tolerance between the unit cells 110, 120, 130, 140, and 150 from occurring. As a result, when the unit cells 110, 120, 130, 140, and 150 are folded to be laminated, a proper folding gap between the unit cells 110, 120, 130, 140, and 150, which is required for the parallel lamination, may be formed to prevent overhang from occurring in the X-axis direction (the full width direction) or significantly reduce an occurrence of the overhang.

In the method for manufacturing the secondary battery according to an embodiment of the present invention, the vision measurement step (S20), the unit cell grasping step (S10), and the input step (S30) may be repeatedly performed to sequentially seat the unit cells 110, 120, 130, 140, and 150 on the separation film R.

Hereinafter, a method for manufacturing an electrode assembly according to another embodiment of the present invention will be described.

Figure 7:
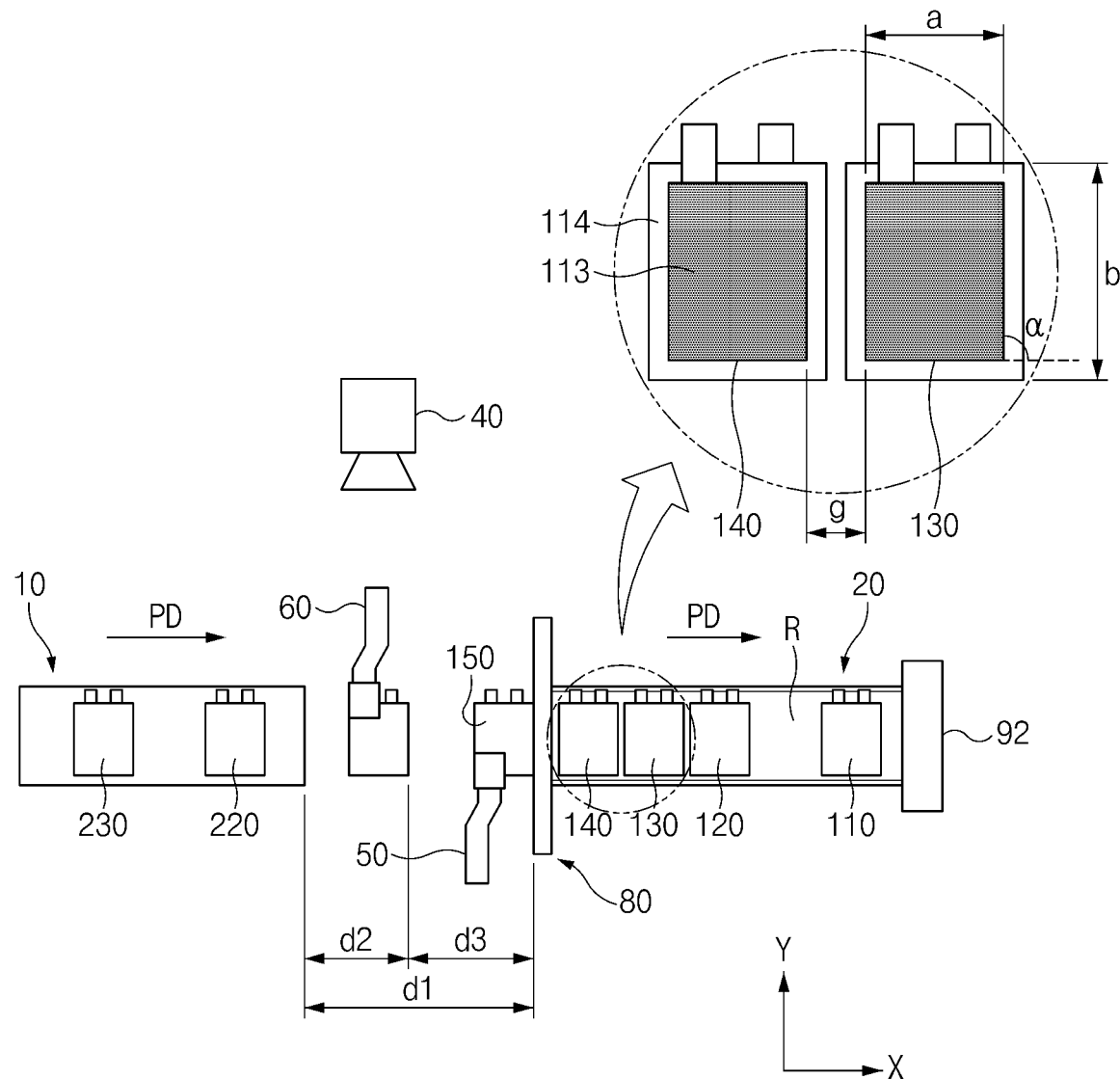
FIG. 7 is a plan view illustrating an example of a method for manufacturing an electrode assembly according to another embodiment of the present invention.
Figure 8:
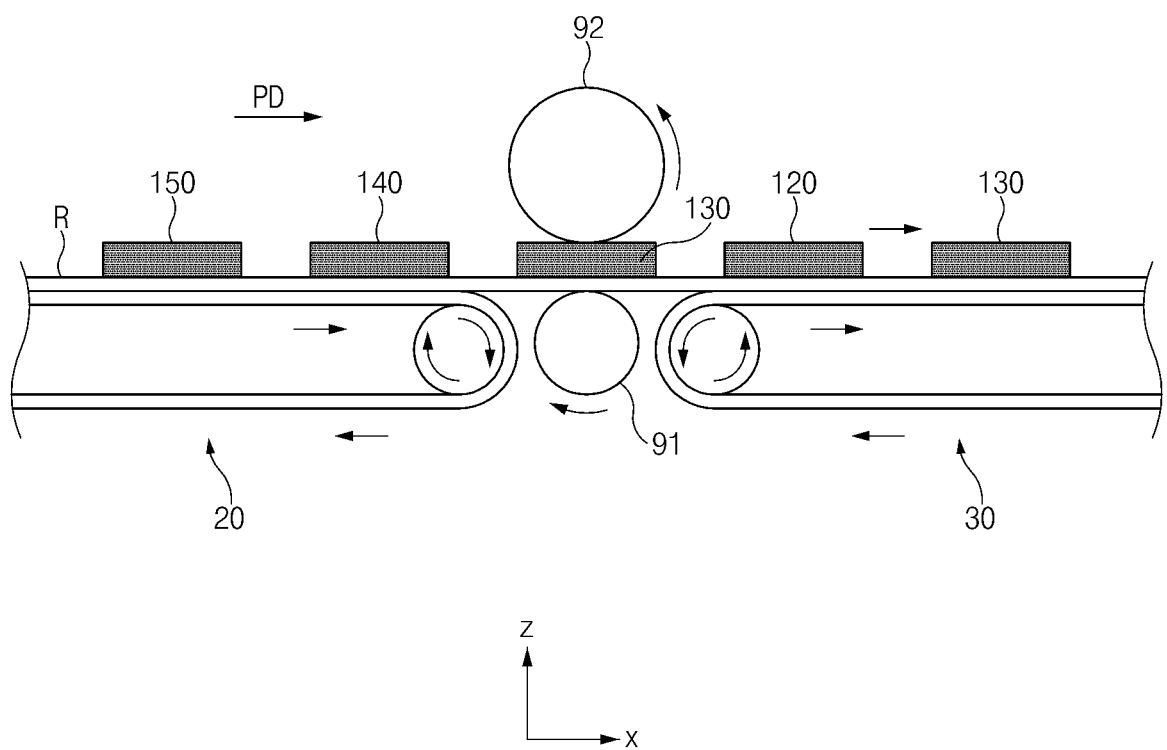
FIG. 8 is a side view illustrating an example of a lamination step in the method for manufacturing the electrode assembly according to another embodiment of the present invention.
Figure 9:
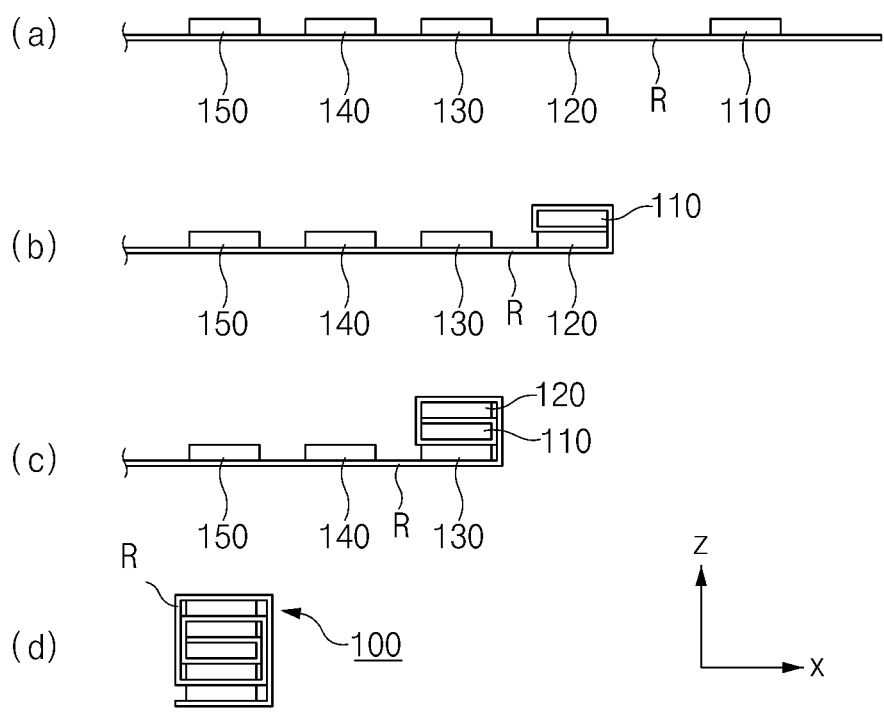
FIG. 9 is a side view illustrating an example of a folding step in the method for manufacturing the electrode assembly according to another embodiment of the present invention.

FIG. 7 is a plan view illustrating an example of a method for manufacturing an electrode assembly according to another embodiment of the present invention, FIG. 8 is a side view illustrating an example of a lamination step in the method for manufacturing the electrode assembly according to another embodiment of the present invention, and FIG. 9 is a side view illustrating an example of a folding step in the method for manufacturing the electrode assembly according to another embodiment of the present invention.

Referring to FIGS. 1 and 7 to 9, a method for manufacturing an electrode assembly according to another embodiment of the present invention is a method for manufacturing an electrode assembly by folding unit cells 110, 120, 130, 140, and 150 after the unit cells 110, 120, 130, 140, and 150, which comprise an electrode 113 and a separator 114, are seated on a separation film R at predetermined intervals and comprises a unit cell grasping step (S10) of grasping the unit cells 110, 120, 130, 140, and 150 by using movable grippers 50 and 60, a vision measurement step (S20) of vision-measuring a full width a of the unit cells 110, 120, 130, 140, and 150, an input step (S30) of moving the unit cells 110, 120, 130, 140, and 150 so as to be seated on the separation film R, a lamination step of attaching the unit cells 110, 120, 130, 140, and 150, which are seated on the separation film R, to each other, and a folding step of folding and laminating the unit cells 110, 120, 130, 140, and 150.

The method for manufacturing the electrode assembly according to another embodiment of the present invention further comprises the lamination step and the folding step when compared to the method for manufacturing the electrode assembly according to the foregoing embodiment and is different from the method for manufacturing the electrode assembly according to the foregoing embodiment in that an actually measured value of each of the unit cells 110, 120, 130, 140, and 150 in a full length direction is further reflected to input the unit cells 110, 120, 130, 140, and 150. Thus, contents of this embodiment, which are duplicated with those according to the forgoing embodiment, will be briefly described, and also, differences therebetween will be mainly described.

In more detail, referring to FIGS. 1 and 7, in the vision measurement step (S20) of the method for manufacturing the electrode assembly according to another embodiment of the present invention, a full width a and a full length b of each of the unit cells 110, 120, 130, 140, and 150 may be vision-measured through a vision device 40. Here, the vision device 40 may be disposed, for example, in one direction of an upward direction or a diagonal direction of the unit cells 110, 120, 130, 140, and 150 to vision-measure the full width a and a full length b of each of the unit cells 110, 120, 130, 140, and 150.

Also, in the vision measurement step (S20), each of the positions of ends of the outermost electrode 113 in a full width direction and a full length direction of each of the unit cells 110, 120, 130, 140, and 150 may be detected.

In the input step (S30), the movable grippers 50 and 60 grasp the unit cells 110, 120, 130, 140, and 150 and then move the unit cells 110, 120, 130, 140, and 150 to correspond to a full width value and a full length value of each of the unit cells 110, 120, 130, 140, and 150, which is measured through the vision measurement step (S20), thereby seating the unit cells 110, 120, 130, 140, and 150 on the separation film R. Here, in the input step (S30), while a control unit 70 adjusts the moving amount of each of the unit cells 110, 120, 130, 140 and 150 in an X-axis direction and a Y-axis direction, which are the folding progressing direction, and an angle of each of the unit cells 110, 120, 130, 140 and 150 with respect to the Y axis, the unit cells 110, 120, 130, 140 and 150 may be input into an input unit constituted by a lip roller 80 and a conveyor belt 20. That is, in the input step (S30), the control unit 70 may detect deviations between a full width value, a full length value, and an angle with respect to the Y axis of each of the unit cells 110, 120, 130, 140 and 150, which are stored in a memory 72, and the actual full width value, the actual full length value, and the actual angle value with respect to the Y axis of each of the unit cells 110, 120, 130, 140 and 150, which are vision-measured in the vision measurement step (S20), to move the unit cells 110, 120, 130, 140 and 150 through the movable grippers 50 and 60, thereby correcting the deviations.

Thus, when each of the unit cells 110, 120, 130, 140 and 150 is manufactured with a size different from the preset value or supplied at an angle different from the preset value, the X-axis and Y-axis moving distances of each of the movable grippers 50 and 60 may be corrected to seat the unit cells 110, 120, 130, 140 and 150 on the separation film R through the input unit.

Thus, a gap tolerance between the unit cells 110, 120, 130, 140 and 150 seated on the separation film R may be prevented from occurring according to a tolerance (error) of the actual full width value of each of the unit cells 110, 120, 130, 140 and 150 to prevent overhang in the X-axis direction (the full width direction) of the unit cells 110, 120, 130, 140 and 150 from occurring. Also, when the unit cells 110, 120, 130, 140 and 150 are folded to be laminated according to the tolerance of the actual full length value of each of the unit cells 110, 120, 130, 140 and 150, the occurrence of the overhang in the Y-axis direction (the full length direction) may be prevented or significantly reduced.

Referring to FIGS. 7 and 8, in the lamination step, the unit cells 110, 120, 130, 140 and 150 seated on the separation film R after being input through the input unit in the input step (S30) may be attached to each other through the lamination.

Also, in the lamination step, the unit cells 110, 120, 130, 140 and 150 seated on the separation film R in the input step (S30) may be pressed by pressing rollers 91 and 92 so that the unit cells 110, 120, 130, 140 and 150 are fixed to the separation film R. Here, in the lamination step, for example, the pair of pressing rollers 91 and 92 may be disposed above and below the separation film R and the unit cells 110, 120, 130, 140 and 150, which are moved in the folding progressing direction PD. Then, the separation film R and the unit cells 110, 120, 130, 140 and 150 may pass between the pair of pressing rollers 91 and 92 so as to be pressed. Here, conveyor belts 20 and 30 may be respectively provided on both sides of the pressing rollers 91 and 92 to move the unit cells 110, 120, 130, 140 and 150.

Furthermore, in the lamination step, the pair of pressing rollers 91 and 92 and a heater maybe connected to each other to press the unit cells 110, 120, 130, 140 and 150 while applying heat.

Referring to FIG. 9, in the folding step, after the lamination step, the unit cells 110, 120, 130, 140 and 150 may be folded to be laminated so that the separation film R is disposed between the unit cells 110, 120, 130, 140 and 150.

Also, in the folding step, a rotatable gripper (not shown) may grasp a first bi-cell 110, which is disposed at an initial position of the separation film R, of the unit cells 110, 120, 130, 140 and 150 forming one electrode assembly 100 and then rotate to fold the unit cells 110, 120, 130, 140 and 150.

Hereinafter, a method for manufacturing a secondary battery according to an embodiment of the present invention will be described.

Figure 10:
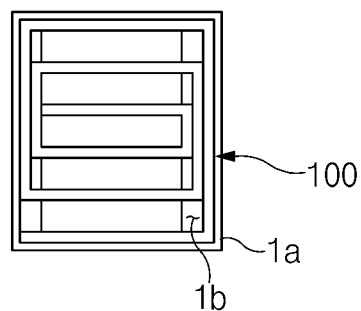
FIG. 10 is a side view illustrating an accommodation step in a method for manufacturing a secondary battery according to an embodiment of the present invention.

FIG. 10 is a side view illustrating an accommodation step in the method for manufacturing the secondary battery according to an embodiment of the present invention.

Referring to FIG. 10, a method for manufacturing a secondary battery according to an embodiment of the present invention relates to a method for manufacturing a secondary battery by using the electrode assembly 100 manufactured according to the method for manufacturing the electrode assembly according to the foregoing embodiment and the method for manufacturing the electrode assembly according to another embodiment. Thus, contents of this embodiment, which are duplicated with those according to the forgoing embodiments, will be briefly described, and also, differences therebetween will be mainly described.

Referring to FIGS. 1 and 10, a method for manufacturing a secondary battery according to an embodiment of the present invention is a method for manufacturing a secondary battery 1 by folding unit cells 110, 120, 130, 140, and 150 after the unit cells 110, 120, 130, 140, and 150, which comprise an electrode 113 and a separator 114, are seated on a separation film R at predetermined intervals to manufacture an electrode assembly 100 and then accommodating the manufactured electrode assembly 100 into a battery case 1*a* and comprises a unit cell grasping step (S10) of grasping the unit cells 110, 120, 130, 140, and 150 by using movable grippers 50 and 60, a vision measurement step (S20) of vision-measuring a full width a of the unit cells 110, 120, 130, 140, and 150, an input step (S30) of moving the unit cells 110, 120, 130, 140, and 150 so as to be seated on the separation film R, a lamination step of attaching the unit cells 110, 120, 130, 140, and 150, which are seated on the separation film R, to each other, a folding step of folding and laminating the unit cells 110, 120, 130, 140, and 150, and an accommodation step of accommodating the electrode assembly 100 into the battery case 1*a* (see FIG. 10).

In the accommodation step of the method for manufacturing the secondary battery according to an embodiment of the present invention, the electrode assembly 100 may be accommodated in the battery case 1*a* in which an accommodation part 1*b* is formed to manufacture the secondary battery 1.

Also, the accommodation step may comprise a sealing step of thermally fusing an outer circumferential surface of the battery case 1*a* after the electrode assembly 100 is accommodated in the battery case 1*a* to seal the battery case 1*a*.

Furthermore, in the accommodation step, an electrolyte together with the electrode assembly 100 may be further accommodated in the accommodation part 1*b* of the battery case 1*a*.

While the present invention has been described in detail with reference to exemplary embodiments, it is to be understood that the scope of the present invention is not limited to the method for manufacturing the electrode assembly and the method for manufacturing the secondary battery according to the present invention. It will be understood by those of ordinary skill in the art that various changes in form and details may be made therein without departing from the spirit and scope of the invention.

Furthermore, the scope of protection of the present invention will be clarified by the appended claims.

The invention claimed is:

1. A method for manufacturing an electrode assembly, the method comprising:
   a unit cell grasping step of moving a movable gripper to grasp a unit cell comprising an electrode and a separator;
   a vision measurement step of vision-measuring a width value of the unit cell;
   an input step of determining a width difference between the width value of the unit cell and a set width value stored in a memory, and moving the unit cell by the movable gripper while taking into account the width difference to seat the unit cell on a separation film that extends along an axis in a folding progressing direction,
   wherein the vision measurement step, the unit cell grasping step, and the input step are repeatedly performed to sequentially seat two or more unit cells on the separation film along the folding progression direction before folding the separation film.

2. The method of claim 1, wherein, in the vision measurement step, a position of an end of an outermost electrode of the unit cell in a width direction is detected.

3. The method of claim 2, wherein the vision measurement step further includes vision-measuring an angle between a line of the end of the outermost electrode of the unit cell in the width direction and an axis perpendicular to the folding progressing direction of the separation film.

4. The method of claim 3, wherein the input step further includes moving the unit cell by the movable gripper to so that the line of the end of the outermost electrode of the unit cell is parallel to the axis perpendicular to the folding progressing direction of the separation film.

5. The method of claim 1, wherein:
the vision measurement step further comprises vision-measuring a length value of the unit cell; and
the input step further comprises determining a length difference between the length value of the unit cell and a set length value stored in a memory, and moving the unit cell by the movable gripper while taking into account the length difference to seat the unit cell on the separation film.

6. The method of claim 5, wherein the vision measurement step further includes vision-measuring an angle between a line of an end of an outermost electrode of the unit cell in the width direction and an axis perpendicular to the folding progressing direction of the separation film.

7. The method of claim 6, wherein the input step further includes moving the unit cell by the movable gripper to so that the line of the end of the outermost electrode of the unit cell is parallel to the axis perpendicular to the folding progressing direction of the separation film.

8. The method of claim 1, wherein the vision measurement step includes performing the vision-measuring with a vision device.

9. The method of claim 8, wherein the vision device is a camera, an x-ray machine, or a computer tomography machine.

10. The method of claim 1, wherein, in the input step, a control unit calculates an input moving amount of the movable gripper based on the measured width value of the unit cell and reflects the calculated input moving amount to move the movable gripper to seat the unit cell on the separation film.

11. The method of claim 10, wherein, in the input step, the control unit receives an image signal, which is vision-measured in the vision measurement step, to extract the width value of the unit cell, compares the set width value stored in the memory with the extracted width value to correct the input moving amount of movable gripper, and control the movement of the movable gripper according to the corrected input moving amount.

12. The method of claim 11, wherein the vision measurement step, the unit cell grasping step, and the input step are repeatedly performed to sequentially seat the unit cells on the separation film, and wherein, in the input steps, the control unit corrects the input moving amount of the movable gripper to correspond to the width value of each of the unit cells whenever the unit cells are input, thereby seating the unit cells on the separation film so that gaps corresponding to gap values of the unit cells, which are stored in the memory, are formed.

13. The method of claim 1, wherein the vision measurement step, the unit cell grasping step, and the input step are repeatedly performed to sequentially seat the unit cells on the separation film, and
the method further comprises:
a lamination step of attaching the unit cells seated on the separation film to each other through lamination; and
a folding step of folding the unit cells so that the separation film is disposed between the unit cells after the lamination step.

14. The method of claim 13, wherein, in the lamination step, rollers press the unit cells seated on the separation film so that the unit cells are fixed to the separation film.

15. The method of claim 14, wherein, in the lamination step, a heater is connected to at least one of the rollers to apply heat while pressing the unit cells.

16. The method of claim 13, wherein, in the folding step, a rotatable gripper grasps a first one of the unit cells and rotates to fold the unit cells.

17. The method of claim 1, wherein, in the unit cell grasping step, a control calculates a grasp moving amount of the movable gripper through the measured width value of the unit cell and reflects the calculated grasp moving amount to move the movable gripper so that the movable gripper grasps the unit cell.

18. A method for manufacturing a secondary battery, the method comprising:
a manufacturing step of manufacturing an electrode assembly according to claim 13; and
an accommodation step of accommodating the folded electrode assembly in a battery case.

19. The method of claim 18, wherein the accommodation step includes a sealing step of thermally fusing an outer circumferential surface of the battery case after the electrode assembly is accommodated in the battery case to seal the battery case.

20. The method of claim 19, wherein the accommodation step further includes providing an electrolyte together with the electrode assembly in the battery case.

21. The method of claim 1, wherein the set width value stored in the memory is a preset value.

* * * * *

UNITED STATES PATENT AND TRADEMARK OFFICE
CERTIFICATE OF CORRECTION

| | | |
|---|---|---|
| PATENT NO. | : 11,749,841 B2 | Page 1 of 1 |
| APPLICATION NO. | : 16/964455 | |
| DATED | : September 5, 2023 | |
| INVENTOR(S) | : Hyun Tae Kim, Shin Hwa Lee and Woo Yong Lee | |

It is certified that error appears in the above-identified patent and that said Letters Patent is hereby corrected as shown below:

On the Title Page

(71) Applicant – "LG Chern, Ltd." should read -- LG Chem, Ltd. --

Signed and Sealed this
Twenty-fourth Day of October, 2023

Katherine Kelly Vidal
*Director of the United States Patent and Trademark Office*